(12) United States Patent
Wake

(10) Patent No.: US 8,708,848 B2
(45) Date of Patent: Apr. 29, 2014

(54) TENSIONING DEVICE

(75) Inventor: Junichi Wake, Nabari (JP)

(73) Assignee: BorgWarner Inc., Auburn Hills, MI (US)

(*) Notice: Subject to any disclaimer, the term of this patent is extended or adjusted under 35 U.S.C. 154(b) by 251 days.

(21) Appl. No.: 12/999,358

(22) PCT Filed: Jun. 22, 2009

(86) PCT No.: PCT/US2009/048094
§ 371 (c)(1),
(2), (4) Date: Dec. 16, 2010

(87) PCT Pub. No.: WO2009/158298
PCT Pub. Date: Dec. 30, 2009

(65) Prior Publication Data
US 2011/0081998 A1   Apr. 7, 2011

(30) Foreign Application Priority Data
Jun. 26, 2008   (JP) .................... 2008-167316

(51) Int. Cl.
*F16H 7/08*   (2006.01)

(52) U.S. Cl.
USPC .......................................... 474/110

(58) Field of Classification Search
USPC ......................... 474/109, 110, 140
See application file for complete search history.

(56) References Cited

U.S. PATENT DOCUMENTS

| | | | | |
|---|---|---|---|---|
| 4,283,181 A | * | 8/1981 | Sproul | 474/110 |
| 2002/0052260 A1 | * | 5/2002 | Kitamura et al. | 474/135 |
| 2005/0143207 A1 | * | 6/2005 | Hashimoto et al. | 474/109 |
| 2006/0240923 A1 | * | 10/2006 | Yokoyama | 474/111 |
| 2007/0259744 A1 | * | 11/2007 | Lehtovaara et al. | 474/111 |
| 2009/0258737 A1 | * | 10/2009 | Muguruma et al. | 474/111 |
| 2012/0052996 A1 | * | 3/2012 | Koiwa et al. | 474/110 |

FOREIGN PATENT DOCUMENTS

| | | | | |
|---|---|---|---|---|
| EP | 1997770 A1 | * | 12/2008 | |
| JP | 08100851 A | * | 4/1996 | |
| JP | 2003222210 A | * | 8/2003 | F16H 7/08 |

OTHER PUBLICATIONS

Machine Translation of JP 2003-222210 A.*

* cited by examiner

*Primary Examiner* — Michael Mansen
*Assistant Examiner* — Diem Tran

(57) ABSTRACT

To increase the pressing force on a chain as the chain undergoes greater elongation. [Resolving Means] Provision is made for: a tensioner arm 2 in which a through-hole 21a is formed at a free end 21 which can pivot about a pivoting end 20; a hydraulic tensioner 3 for causing the tensioner arm 2 to pivot about the pivoting end 20; a lever arm 4 having a boss part 40 which is rotatably supported in the through-hole 21a at the free end 21 and comprises a pin insertion hole 40a at a position which is offset from the center O of the through-hole 21a, said lever arm also having a lever part 41 which extends from the boss part 40 toward the hydraulic tensioner 3 with the tip end of a piston 3a of the hydraulic tensioner 3 in abutment against it; and a pin 5 of which one end is fitted in a fixed wall 50, and of which the other end is inserted into the pin insertion hole 40a of the boss part 40 of the lever arm 4. When the piston 3a of the hydraulic tensioner 3 extends, the lever arm 4 pivots about the pin 5, whereby the amount of pushing by the free end 21 of the tensioner arm 2 into a chain 104 is increased.

10 Claims, 4 Drawing Sheets

(a)

(b)

TENSIONING DEVICE

TECHNICAL FIELD

The present invention relates to a tensioning device for producing tension in a chain, and more specifically to an improved structure for increasing the pressing force on the chain as the chain undergoes greater elongation.

BACKGROUND OF THE INVENTION

Various systems have been used in the past as tensioning devices for producing tension in chains. For example, the tensioning device shown in Japanese Unexamined Utility Model Application Publication S52-34377 consists of a cam plate having a cam surface which abuts the chain, and a spring which latches on the cam plate and causes the cam plate to turn so that the cam surface runs into the chain when the chain undergoes elongation.

Furthermore, the tensioning device shown in Japanese Unexamined Utility Model Application Publication S52-99478 consists of a tensioner arm on which the chain slides, a cam plate having a cam surface which abuts the back surface of the tensioner arm, and a spring which causes the cam plate to turn so that the cam surface runs into the back surface of the tensioner arm when the chain undergoes elongation.

However, with the tensioning devices disclosed in the publications mentioned above, when the can surface runs into the chain or tensioner arm during chain elongation, the amount of elastic deformation of the spring decreases, and therefore the spring force decreases. Consequently, the pressing force from the spring which acts on the chain through the cam is also reduced.

SUMMARY OF THE INVENTION

The present invention has been devised in view of the situation that has existed until now, and the issue which the present invention aims to resolve is that of providing a tensioning device with which it is possible to increase the pressing force on the chain as the chain undergoes greater elongation.

The tensioning device according to an exemplary embodiment of the invention provided with: a tensioner arm which has a chain sliding surface and in which a through-hole is formed at a free end which can pivot about a pivoting end; a hydraulic tensioner which acts on the free end of the tensioner arm so that the tensioner arm pivots about the pivoting end; a lever arm having a boss part which is rotatably supported in the through-hole at the free end and comprises a pin insertion hole at a position which is offset from the center of the through-hole, said lever arm also having a lever part which is integrally provided with the boss part at one end of the boss part and which extends from the boss part toward the hydraulic tensioner with the tip end of a piston of the hydraulic tensioner in abutment against it; and a pin of which one end is fitted in a fixed wall around the tensioner arm, and of which the other end is inserted into the pin insertion hole of the boss part of the lever arm. When the piston of the hydraulic tensioner extends, the lever arm pivots about the pin, whereby the amount of pushing by the free end of the tensioner arm into the chain is increased.

The piston of the hydraulic tensioner extends when slack is produced in the chain as it travels. This being so, the lever part is driven by the piston, whereby the boss part of the lever arm pivots about the pin while rotating inside the through-hole at the free end of the tensioner arm. In this instance, the pin is provided offset from the center of the through-hole at the free end of the tensioner arm (that is to say it is eccentric), and therefore the boss part of the lever arm projects toward the chain as the boss part pivots about the pin, and by means of this the free end of the tensioner arm is moved toward the chain by way of the through-hole at the free end of the tensioner arm. As a result, the amount of pushing by the free end of the tensioner arm into the chain is increased.

In this case, the pressing force which acts on the lever part of the lever arm depends on the hydraulic pressure of the hydraulic tensioner, and therefore this pressing force does not change according to the projection of the piston of the hydraulic tensioner, and it can be kept constant. Accordingly, a constant pressing force always acts on the lever part of the lever arm during operation, and consequently the pressing force which the free end of the tensioner arm exerts toward the chain increases as the amount of projection of the piston of the hydraulic tensioner increases, leading to an increase in the amount of pushing by the free end of the tensioner arm into the chain.

In another embodiment of the invention, one end of the pin is fixed to the fixed wall, while the other end is rotatably supported in the pin insertion hole of the boss part.

If the piston of the hydraulic tensioner extends in this case, when the boss part of the lever arm rotates inside the through-hole at the free end of the tensioner arm, the boss part rotates while sliding about the outer peripheral surface at that other end of the pin.

In a further embodiment of the invention, a long hole is formed at the pivoting end of the tensioner arm, and the pivoting end is pivotably supported on the fixed wall by way of a pin which is inserted into the long hole.

When the boss part of the lever arm has pivoted about the pin in this case, the boss part moves a certain amount toward the pivoting end of the tensioner arm or away from the pivoting end thereof, as a result of which the pivoting end of the tensioner arm moves a certain amount, but this amount of movement can be absorbed at this time because the long hole is formed at the pivoting end.

DESCRIPTION OF PREFERRED EMBODIMENTS OF THE INVENTION

As described above, according to the tensioning device of a preferred embodiment of the present invention, a through-hole is formed at the free end of the tensioner arm with the boss part of the lever arm being provided so as to be able to rotate inside the through-hole, and the pin insertion hole is formed in the boss part at a position which is offset from the center of the through-hole; one end of the pin is fitted in the surrounding fixed wall, while the other end is inserted into the pin insertion hole, and the lever arm is provided with a lever part which extends from the boss part as far as the hydraulic tensioner and which is abutted by the tip end of the piston of the hydraulic tensioner, and therefore when the piston of the hydraulic tensioner extends, the boss part of the lever arm pivots about the pin while rotating inside the through-hole at the free end of the tensioner arm, whereby the boss part of the lever arm projects toward the chain and the amount of pushing by the free end of the tensioner arm into the chain is increased.

In this case, the pressing force which acts on the lever part of the lever arm depends on the hydraulic pressure of the hydraulic tensioner, and therefore this pressing force does not change according to the projection of the piston of the hydraulic tensioner, and it can be kept constant. Consequently, the pressing force which the free end of the tensioner arm exerts toward the chain can be increased as the amount of projection of the piston of the hydraulic tensioner increases (and therefore as chain elongation increases), leading to an increase in the amount of pushing by the free end of the tensioner arm into the chain.

Figure 1:
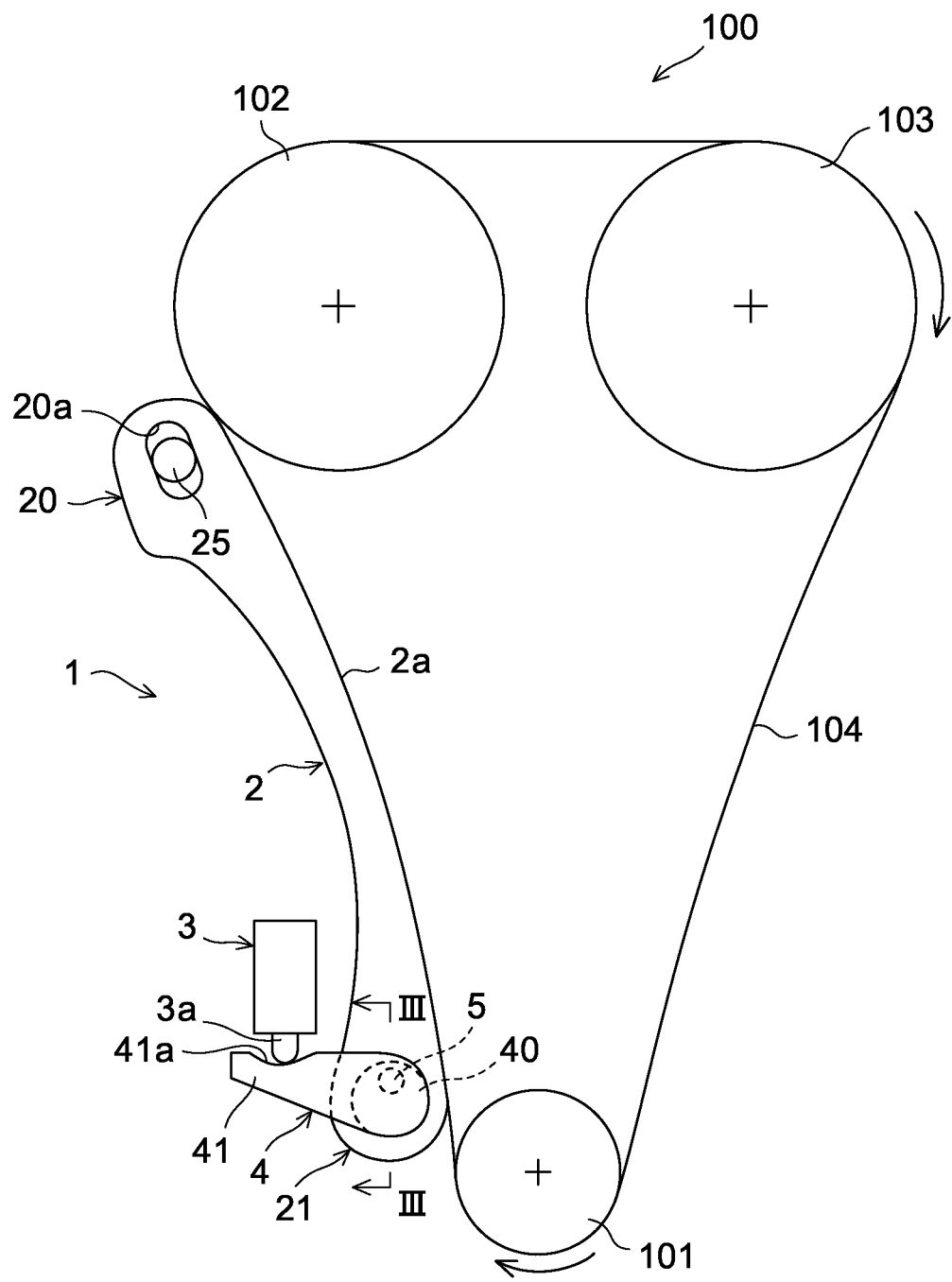
FIG. 1 is a schematic front view of a timing chain system in which the tensioning device according to an exemplary embodiment of the present invention is employed.
Figure 2:
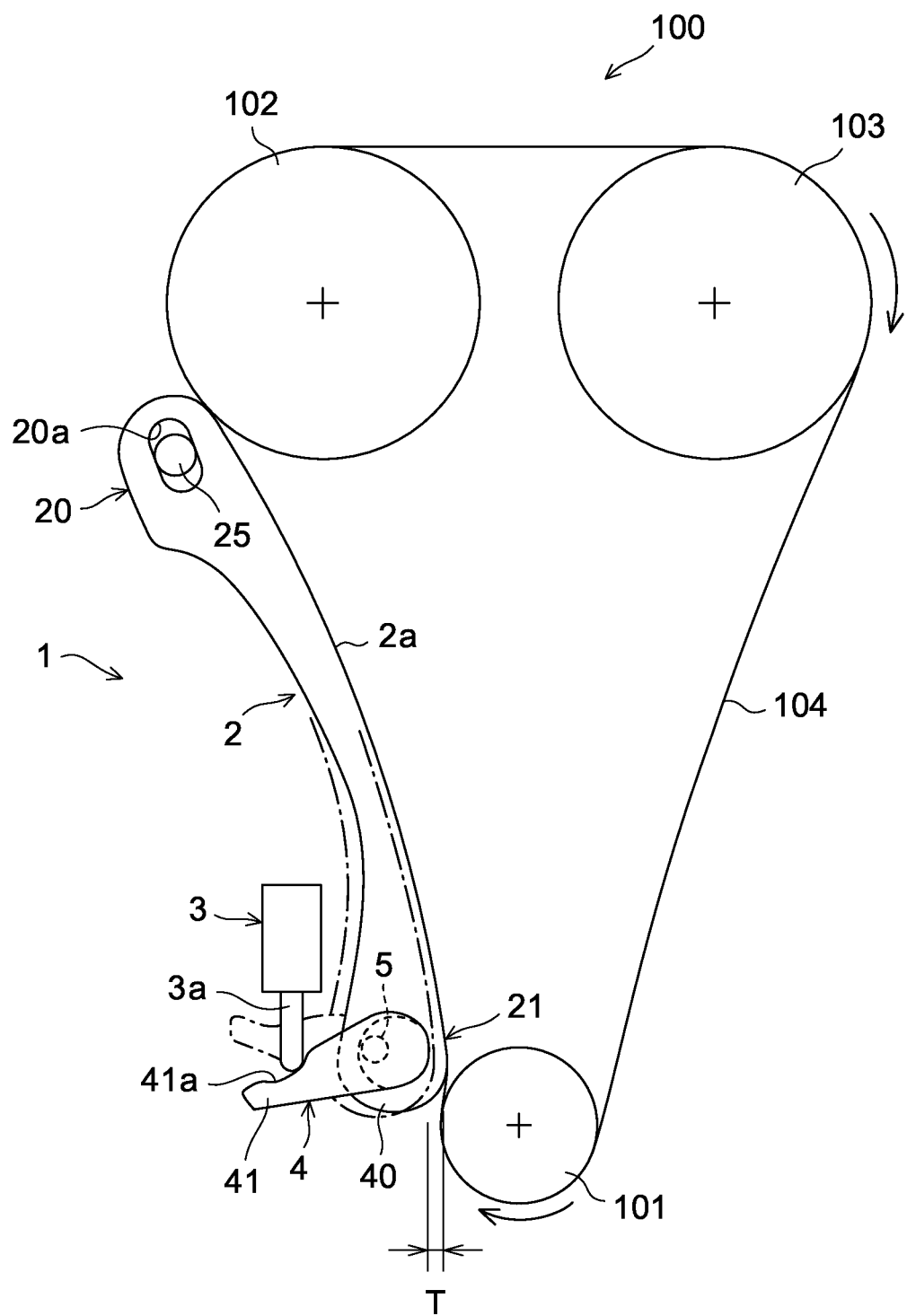
FIG. 2 shows a state in which the chain in the timing chain system of FIG. 1 is elongated.
Figure 3:
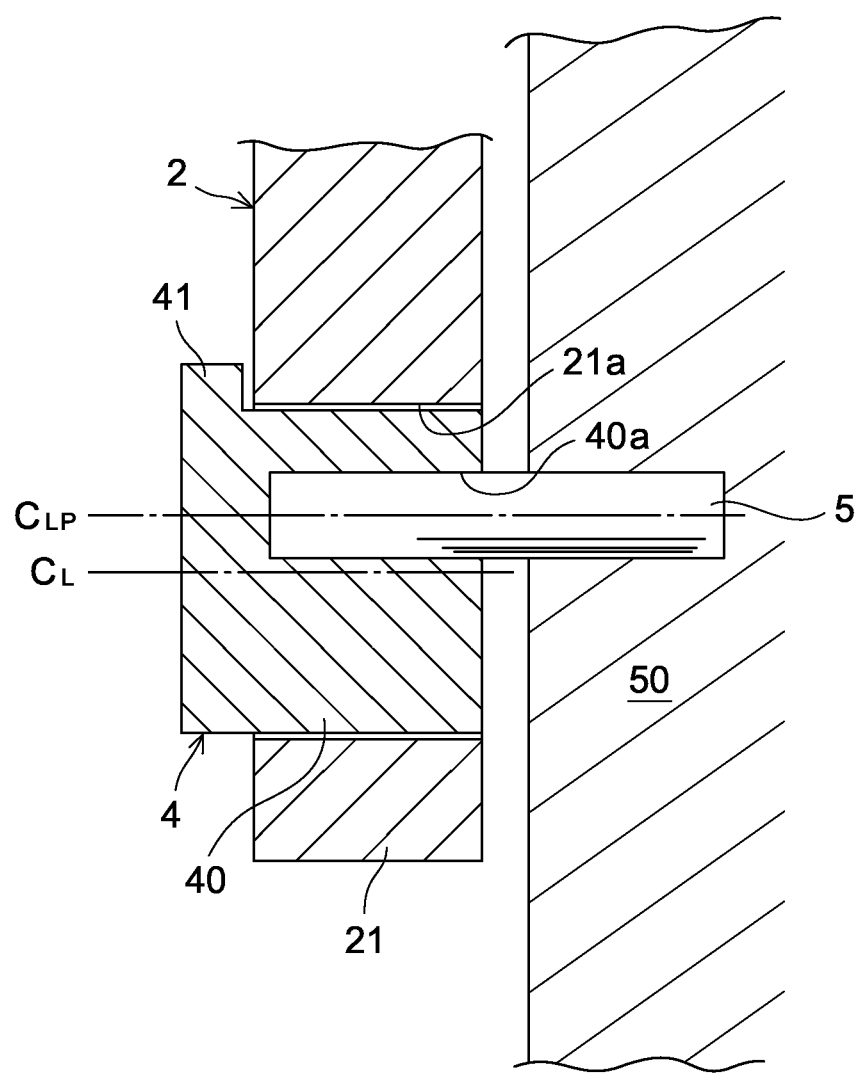
FIG. 3 is a view in cross section along the line III-III in FIG. 1.
Figure 4:
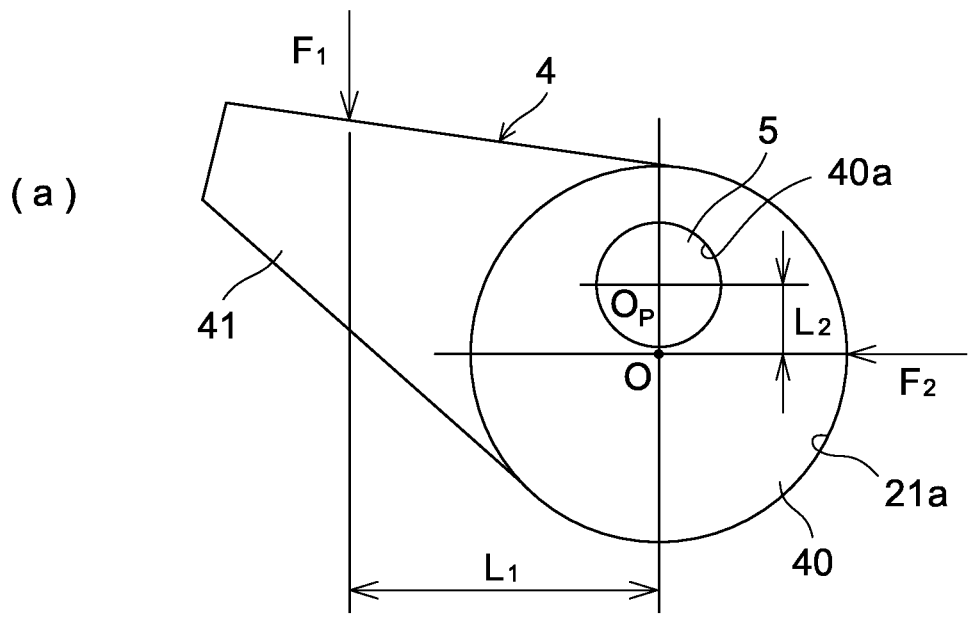
FIGS. 4(a) and 4(b) illustrates the operation of the lever arm, with (a) showing the state of the chain before elongation, and (b) showing the state of the chain after elongation.
Figure 4:
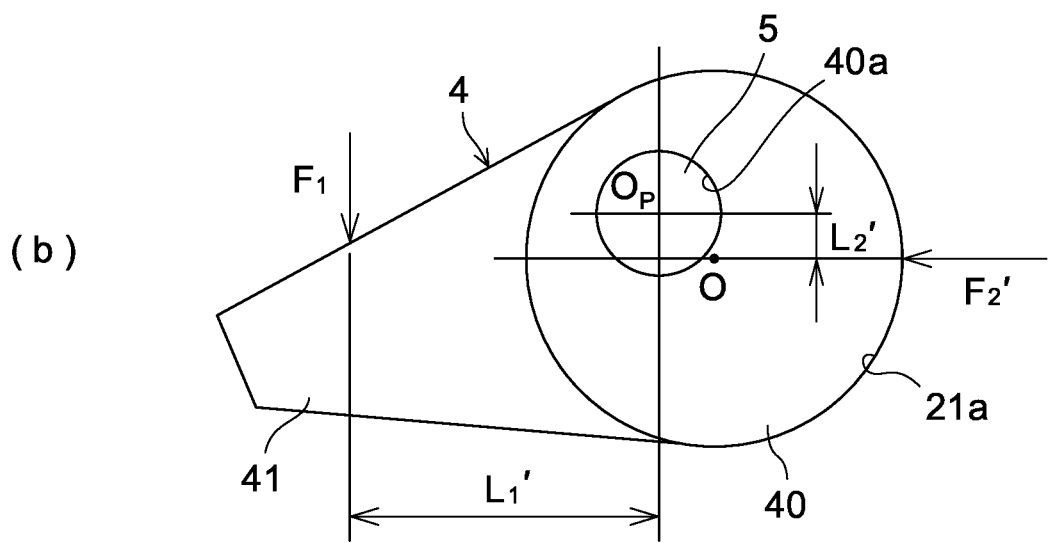

FIGS. 1 to 4 illustrate the tensioning device according to an exemplary embodiment of the present invention, where FIG. 1 is a schematic front view of a timing chain system in which the tensioning device according to this exemplary embodiment is employed; FIG. 2 shows a state in which the chain in the timing chain system (FIG. 1) is elongated; FIG. 3 is a view in cross section along the line III-III of FIG. 1; and FIG. 4 illustrates the operation of the lever arm, with FIG. 4(a) showing the state of the chain before elongation, and FIG. 4(b) showing the state of the chain after elongation.

As shown in FIGS. 1 and 2, this timing chain system 100 is provided with a crank sprocket 101 which is mounted on a crankshaft of an engine; cam sprockets 102, 103 which are mounted on a camshaft; and a timing chain 104 which is wound around the sprockets 101, 102, 103. It should be noted that the arrows in the figure denote the direction of rotation of the sprockets.

A tensioning device 1 is provided at the slack side span of the timing chain 104. The tensioning device 1 is provided with: a tensioner arm 2 having a pivoting end 20 and a free end 21 which can pivot about said pivoting end, and having a chain sliding surface 2a on which the chain 104 slides; a hydraulic tensioner 3 which acts on the free end 21 of the tensioner arm 2 so as to cause the tensioner arm 2 to pivot about the pivoting end 20; and a lever arm 4 which is joined to the free end 21 of the tensioner arm 2.

As shown in FIG. 3, a through-hole 21a is formed at the free end 21 of the tensioner arm 2. Meanwhile, the lever arm 4 has a cylindrical boss part 40, and a lever part 41 which is provided as a single piece with the boss part 40 at one end of the boss part 40 (the left-hand end in FIG. 3) and extends from the boss part 40 up to the hydraulic tensioner 3 (see FIGS. 1 and 2), and the boss part 40 is rotatably supported in the through-hole 21a at the free end 21 of the tensioner arm 2.

The boss part 40 has a pin insertion hole 40a at a position which is upwardly offset from a center line $C_L$ of the through-hole 21a (see the center line $C_{LP}$). Meanwhile, one end of a pin 5 is fixed in a fixed wall (the cylinder block, for example) surrounding the tensioner arm 2, and the other end of the pin 5 is inserted into the pin insertion hole 40a of the boss part 40 of the lever arm 4. The boss part 40 can rotate about the pin 5.

A recessed surface 41a is formed in the lever part 41 of the lever arm 4, and the tip end of a piston 3a of the hydraulic tensioner 3 is in abutment with the recessed surface 41a.

Furthermore, a long hole 20a is formed at the pivoting end 20 of the tensioner arm 2, and the pivoting end 20 is pivotably supported on the fixed wall such as the cylinder block by way of a pin 25 which is inserted into the long hole 20a.

The operational effects of this exemplary embodiment will be described next.

As shown in FIGS. 1 and 4(a), in a state before the timing chain 104 is elongated by wear, the pressing force which acts on the lever part 41 of the lever arm 4 from the piston 3a of the hydraulic tensioner 3 is designated $F_1$. By means of this pressing force $F_1$, the lever part 41 and boss part 40 attempt to rotate counterclockwise in the figure about the pin 5. As a result, the boss part 40 of the lever arm 4 presses the free end 21 of the tensioner arm 2 toward the chain, by way of the through-hole 21a at the free end 21. At this point, the opposing force which acts on the free end 21 from the chain is designated $F_2$. Furthermore, the distance between the line on which the pressing force $F_1$ acts and the center $O_P$ of the pin 5 is designated $L_1$, and the distance between the line on which the pressing force $F_2$ acts and the center $O_P$ of the pin 5 is designated $L_2$.

Here, the moment balance equation for the center $O_P$ of the pin 5 is established in the following manner:

$$F_1 \cdot L_1 = F_2 \cdot L_2$$

and solving this for $F_2$, $$F_2 = F_1 \cdot L_1 / L_2 \qquad (1)$$

Next, when the timing chain 104 is elongated by wear, as shown in FIG. 2, the piston 3a of the hydraulic tensioner 3 extends to press the lever part 41 of the lever arm 4, and the lever part 41 pivots counterclockwise in the figure. By means of this, the boss part 40 of the lever arm 4 pivots about the pin 5 and projects toward the chain (the right-hand side in the figure—see FIG. 4(b)). As a result, the amount of pushing by the free end 21 of the tensioner arm 2 into the chain increases (see the increased amount of pushing T in FIG. 2).

At this point, as shown in FIG. 4(b), the pressing force which acts on the lever part 41 of the lever arm 4 from the piston 3a of the hydraulic tensioner 3 stays as $F_1$, provided that the hydraulic pressure supplied to the hydraulic tensioner 3 is constant. Here, if the distance between the line on which the pressing force $F_1$ acts and the center $O_P$ of the pin 5 is designated $L_1'$, the lever part 41 pivots about the center $O_P$ of the pin 5, and therefore $L_1' = L_1$. Furthermore, when the opposing force which acts on the free end 21 from the chain, due to the fact that the boss part 40 of the lever arm 4 presses the free end 21 of the tensioner arm 2 toward the chain, is designated and the distance between the line on which the force $F_2'$ acts and the center $O_P$ of the pin 5 is designated $L_2'$, the moment balance equation relating to the center $O_P$ of the pin 5 is as follows:

$$F_1 \cdot L_1' = F_2' \cdot L_2'$$

here, $L_1' = L_1$ and therefore $$F_1 \cdot L_1 = F_2' \cdot L_2'$$

and solving this for $F_2'$, $$F_2' = F_1 \cdot L_1 / L_2' \qquad (2)$$

When we compare the right-hand side of equations (1) and (2), $L_2' < L_2$, and therefore $F_2' > F_2$.

In this way, the pressing force exerted by the free end 21 of the tensioner arm 2 toward the chain increases as the amount of projection of the piston of the hydraulic tensioner 3 increases, leading to an increase in the amount of pushing by the free end 21 of the tensioner arm 2 into the chain.

When the chain operates initially without any wear, the pressing force on the chain need not be great, and if it is too great, the chain is subjected to wear, and wear of the chain sliding surface of the tensioner arm is promoted.

In the exemplary embodiment described above, when the chain is worn, the boss part of the lever arm projects toward the chain, whereby the pressing force on the chain can be increased, and therefore when the chain operates initially without any wear, it is possible to reduce the pressing force on the chain by reducing the hydraulic pressure of the hydraulic tensioner. By means of this, wear of the chain when it runs initially can be reduced, and the engine fuel consumption can be improved.

Although the invention has been described with respect to preferred embodiments, it is to be also understood that it is not to be so limited since changes and modifications can be made therein which are within the full scope of this invention as detailed by the following claims.

The invention claimed is:

1. A tensioning device comprising a tensioner arm which has a chain sliding surface on which a chain slides, and which has a free end which can pivot about a pivoting end, said tensioner arm having a through-hole formed in said free end;
   a lever arm having a boss part which is rotatably supported in the through-hole at said free end and comprises a pin insertion hole at a position which is offset from the through-hole, said lever arm also having a lever part which is integrally provided with the boss part at one end of the boss part and which extends from the boss part;
   a hydraulic tensioner which acts on said lever part of said lever arm; said hydraulic tensioner having a piston member with a tip end; and
   a pin member of which one end is fitted in a fixed wall adjacent said tensioner arm, and of which the other end is inserted into the pin insertion hole of the boss part of said lever arm;
   the center of rotation of said boss part being offset from the center line of said pin member;
   wherein as said tip end of said piston of said hydraulic tensioner increasingly extends from said hydraulic tensioner with a constant force, said free end of said tensioner arm when positioned against a chain applies an increasing pressing force against the chain.

2. The tensioning device as set forth in claim 1, wherein the one end of said pin member is fixed to the fixed wall, while the other end is rotatably supported in the pin insertion hole of the boss part.

3. The tensioning device as set forth in claim 1, wherein an elongated slot is formed at the pivoting end of said tensioner arm, and the pivoting end is pivotally supported on the fixed wall by way of a second pin member which is inserted into said elongated slot.

4. A tensioning device comprising a tensioner arm which has a chain sliding surface on which a chain slides, and which has a free end which can pivot about a pivoting end, said tensioner arm having a through-hole formed in said free end;
   a lever arm having a boss part which is rotatably supported in the through-hole at said free end and comprises a pin insertion hole at a position which is offset from the through-hole, said lever arm also having a lever part which is integrally provided with the boss part at one end of the boss part and which extends from the boss part;
   a hydraulic tensioner which acts on said lever part of said lever arm; said hydraulic tensioner having a piston member with a tip end; and
   a pin member of which one end is fitted in a fixed wall adjacent said tensioner arm, and of which the other end is inserted into the pin insertion hole of the boss part of said lever arm;
   the center of rotation of said boss part being offset from the center line of said pin member;
   wherein an elongated slot is formed at the pivoting end of said tensioner arm, and the pivoting end is pivotally supported on the fixed wall by way of a second pin member which is inserted into said elongated slot; and
   wherein when the piston of the hydraulic tensioner extends, the lever arm pivots about the pin member, and whereby the amount of force provided by the free end of the tensioner arm into the chain is increased.

5. A tensioning device comprising a tensioner arm which has a chain sliding surface on which a chain slides, and which has a free end which can pivot about a pivoting end, and tensioner arm having a through-hole formed in said free end;
   a lever arm having a boss part which is rotatably supported in the through-hole at said free end and comprises a pin insertion hole at a position which is offset from the through-hole, said lever arm also having a lever part which is integrally provided with the boss part at one end of the boss part and which extends from the boss part;
   a hydraulic tensioner which acts on said lever part of said lever arm; said hydraulic tensioner having a piston member with a tip end; and
   a first pin member of which one end is fitted in a fixed wall adjacent said tensioner arm, and of which the other end is inserted into the pin insertion hole of the boss part of said lever arm;
   said pivoting end having an elongated slot and being pivotably supported on a fixed wall with a second pin member being inserted into said elongated slot;
   the center of rotation of said boss part being offset from the center line of said pin member;
   wherein as said tip end of said piston of said hydraulic tensioner increasingly extends from said hydraulic tensioner, the lever arm pivots about the first pin member, and whereby the amount of force provided by the free end of the tensioner arm into the chain is increased, said free end of said tensioner arm when positioned against a chain applies a corresponding increase in a pressing force against the chain.

6. A chain tensioner device comprising:
   a tensioner arm having a chain sliding surface on which a chain can slide, said tensioner arm having a first end and a second end;
   said first end having a first opening and adaption to be pivotably attached to a fixed structure;
   said second end being free and having a second opening therein;
   a lever member having a boss member at one end and an arm member at the other end;
   said boss member having a center of rotation and being rotatably positioned in said second opening in said second end of said tensioner arm;
   a pin member having a center of rotation and fixed to a structure at one end and rotatably positioned in said boss member at the other end;
   said pin member center of rotation being parallel to but offset from said boss member center of rotation; and
   a hydraulic tension member with a piston member adapted to act on said arm member of said lever member;
   wherein action of said piston member on said arm member rotates said boss member in said first opening, thereby causing said second end of said tensioner arm to pivot relative to said first end of said tensioner arm and increase tension on a chain.

7. The chain tensioner device set forth in claim 6 wherein said second opening in said second end of said tensioner arm is a through-hole.

8. The chain tensioner device set forth in claim 6 further comprising a recess in said arm member or said lower member, wherein said piston member is adapted to contact said lever member in said recess and apply a force against it.

9. The chain tensioner device set forth in claim 6 wherein said first opening in said first end of said tensioner arm is an elongated slot.

10. The chain tensioner device as set forth in claim 9 wherein said elongated slot is adapted to pivot and slide about a fixed pivot pin member on a fixed structure.

\* \* \* \* \*